(12) United States Patent
Tan et al.

(10) Patent No.: US 12,429,588 B2
(45) Date of Patent: Sep. 30, 2025

(54) TECHNIQUES FOR DYNAMIC TRAILER MONITORING USING FREQUENCY MODULATED CONTINUOUS WAVE BASED LIDAR

(71) Applicant: AEVA, INC., Mountain View, CA (US)

(72) Inventors: Jim Tan, Mountain View, CA (US); James Reuther, Mountain View, CA (US)

(73) Assignee: Aeva, Inc., Mountain View, CA (US)

( * ) Notice: Subject to any disclaimer, the term of this patent is extended or adjusted under 35 U.S.C. 154(b) by 835 days.

(21) Appl. No.: 17/724,263

(22) Filed: Apr. 19, 2022

(65) Prior Publication Data

US 2023/0114328 A1 Apr. 13, 2023

Related U.S. Application Data

(60) Provisional application No. 63/248,871, filed on Sep. 27, 2021.

(51) Int. Cl.
| | |
|---|---|
| *G01S 17/34* | (2020.01) |
| *B60W 40/10* | (2012.01) |
| *G01S 7/48* | (2006.01) |
| *G01S 7/51* | (2006.01) |
| *G01S 17/86* | (2020.01) |
| *G01S 17/89* | (2020.01) |
| *G01S 17/931* | (2020.01) |

(52) U.S. Cl.
CPC ............. *G01S 17/34* (2020.01); *B60W 40/10* (2013.01); *G01S 7/4808* (2013.01); *G01S 7/51* (2013.01); *G01S 17/86* (2020.01); *G01S 17/89* (2013.01); *G01S 17/931* (2020.01); *B60W 2300/14* (2013.01)

(58) Field of Classification Search
CPC .......... G01S 17/34; G01S 17/86; G01S 17/89; G01S 17/931; G01S 7/4808; G01S 7/51; B60W 40/10; B60W 2300/14
USPC .................................. 701/41, 42, 43, 44, 70
See application file for complete search history.

(56) References Cited

FOREIGN PATENT DOCUMENTS

| CA | 2955667 C | * | 6/2021 | ............. B60Q 1/525 |
|---|---|---|---|---|
| JP | 4117425 B2 | * | 7/2008 | ................ B60T 8/24 |
| WO | WO-2024199648 A1 | * | 10/2024 | ............. G05D 1/646 |

* cited by examiner

*Primary Examiner* — Hai H Huynh
(74) *Attorney, Agent, or Firm* — Womble Bond Dickinson (US) LLP (57) ABSTRACT

A method for dynamic monitoring of a trailer using a light detection and ranging (LIDAR) system comprising: scanning the trailer using a set of sensors positioned on a tractor towing the trailer to generate a point cloud of the trailer and monitoring an initial set of motion data of the trailer produced within the point cloud, wherein the motion data comprises velocity data related to the trailer. Provided the initial set of motion data is outside a safe operational threshold, instructing the tractor to perform a corrective action that causes a subsequent set of motion data of the trailer to be within the safe operational threshold. Provided the initial set of motion data is within the safe operational threshold, continuing to monitor the initial set of motion data until the initial set of motion data is outside the safe operational threshold.

24 Claims, 8 Drawing Sheets

TECHNIQUES FOR DYNAMIC TRAILER MONITORING USING FREQUENCY MODULATED CONTINUOUS WAVE BASED LIDAR

CROSS REFERENCE TO RELATED APPLICATIONS

This application claims priority to U.S. provisional application No. 63/248,871, filed Sep. 27, 2021 and entitled "TECHNIQUES FOR DYNAMIC TRAILER MONITORING USING FREQUENCY MODULATED CONTINUOUS WAVE BASED LIDAR," the disclosure of which is hereby incorporated by reference.

FIELD OF INVENTION

The present disclosure is related to light detection and ranging (LIDAR) systems.

BACKGROUND

The operation of tractor trailers raises a number of non-trivial challenges related to the operation and control of the trailers. Particularly with certain classes of trailers (e.g., class-8 rigid trailer), it can be challenging to determine characteristics such as the roll, pitch, yaw rate, and positioning of the trailer with respect to the tractor. Hence, a need exists for a simplified and efficient system for monitoring trailer dynamics.

BRIEF DESCRIPTION OF THE DRAWINGS

For a more complete understanding of the various examples, reference is now made to the following detailed description taken in connection with the accompanying drawings in which like identifiers correspond to like elements.

DETAILED DESCRIPTION

The present disclosure describes various examples of LIDAR systems and methods for monitoring a trailer dynamic using frequency modulated continuous-wave (FMCW) LIDAR sensors. According to some embodiments, one or more LIDAR sensors are positioned on a tractor in order to monitor the trailer dynamic in real time.

Due to the random pairing of tractors and trailers, as well as a high trailer/tractor ratio, there is strong reluctance and concerns by fleets and logistic providers on any added costs to the trailers. Trailers are often old, low-cost cargo compartments, which can pose significant safety and liability risk for automation. Tractor as a service (TaaS) operators may have a liability risk when using high-tech tractors together with older trailers without any precautions or modifications for automation.

Trailer dynamic plays a critical role in overall vehicle stability control. Any shifting of a trailer's center of gravity due to unintended or intended cargo movements (such as pallets being dropped off along a delivery route according to a last-in-first-out delivery operation) can result in uneven weight distribution between the front and rear axles and can significantly influence overall trailer stability. Furthermore, different road surfaces and weather conditions, such as rain, ice, wind, etc. can influence a trailer's behavior. Thus, continuous monitoring of the trailer can provide important information for the driver and for a stability control system.

According to embodiments of the present disclosure, a set of rear-facing FMCW LIDAR sensors can be mounted on one or more sides of a tractor cabin, or at other locations of the tractor cabin. These sensors can be mounted high on the tractor, and may be supported by extended arms in some embodiments, with a full view of some combination of: the trailer end outline, the top and bottom edges of the trailer, flat side panels of the trailer, and the front and sides of the rear outside trailer tires. By monitoring the absolute and relative trailer dynamics, embodiments of the present disclosure can detect whether the trailer is within safe operating parameters and take corrective action, as will be described in greater detail herein. The absolute and relative trailer dynamics of a trailer may include the position, velocity, and acceleration (lateral, longitudinal, and vertical) of the trailer relative to both the tractor and the ground (or any appropriate surface). The absolute and relative trailer dynamics may further include the angular position, velocity, and acceleration (yaw, pitch, and roll) of the trailer relative to both the tractor and the ground.

The techniques disclosed herein can also be implemented with various types of cargo trailers, refrigerated trailers, fuel or liquid tankers that may have a cylindrical shape, flatbed trailers, camper trailers, or any other vehicle that may have one or more hinge points or rotation points between the front of the vehicle and the rear of the vehicle. In some embodiments, the techniques disclosed herein may be implemented in tractors that pull two trailing vehicles, such as road trains or tandem tractor-trailers.

Figure 1:
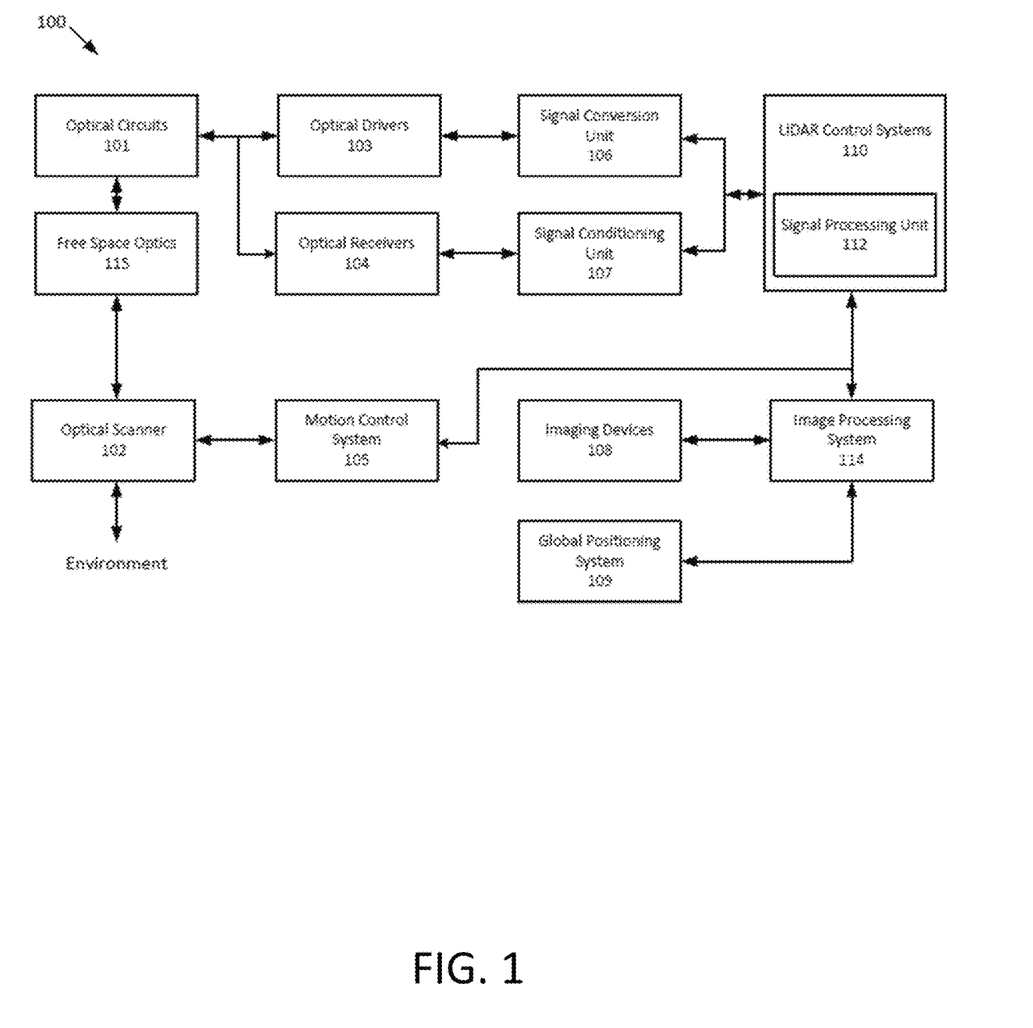
FIG. 1 illustrates an example LIDAR system according to embodiments of the present disclosure.

FIG. 1 illustrates a LIDAR system 100 according to example implementations of the present disclosure that can be implemented on a tractor cabin as described herein. The types of LIDAR systems can include, but are not limited to, time-of-flight systems, frequency modulated (FM) systems, continuous wave (CW) system, FMCW systems, and the like. The LIDAR system 100 includes one or more of each of a number of components, but may include fewer or additional components than shown in FIG. 1. As shown, the LIDAR system 100 includes optical circuits 101 implemented on a photonics chip. The optical circuits 101 may include a combination of active optical components and passive optical components. Active optical components may generate, amplify, and/or detect optical signals and the like.

In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
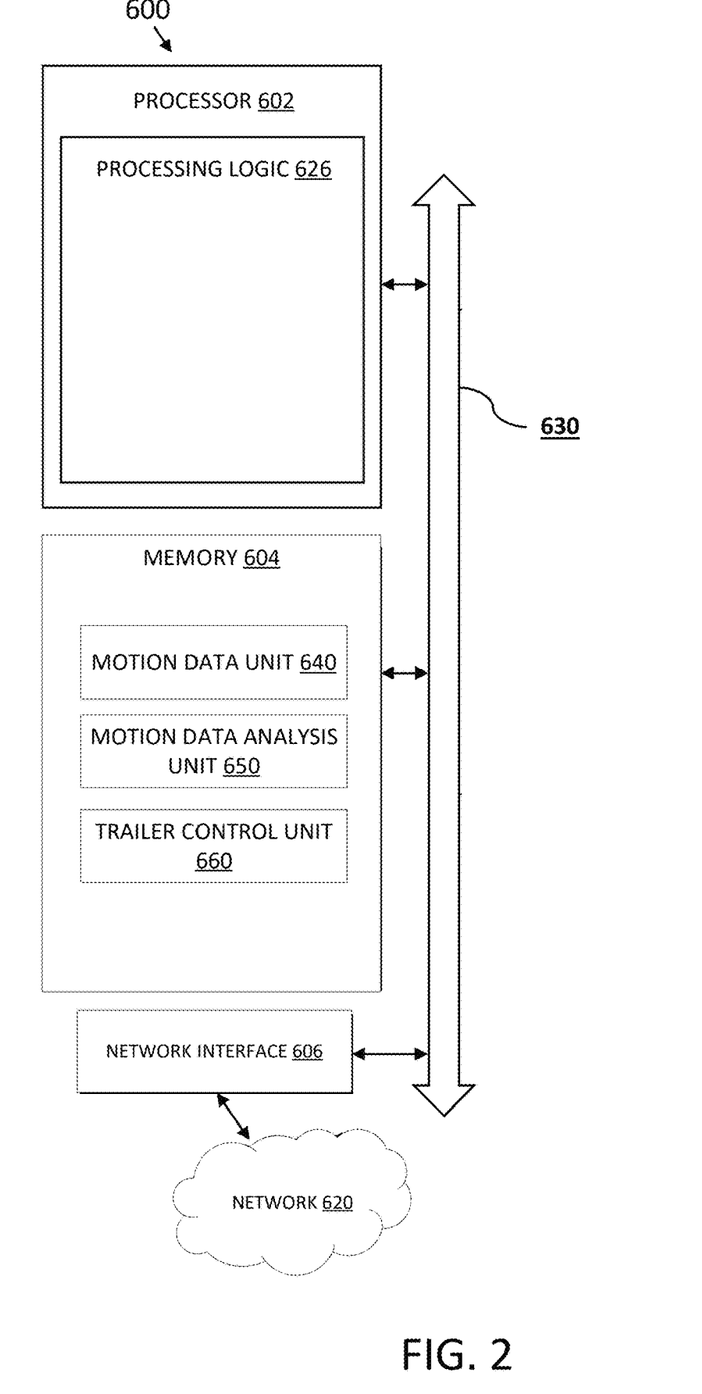
FIG. 2 is a block diagram of an example computing device which may perform one or more of the functions described herein.
Figure 4A:
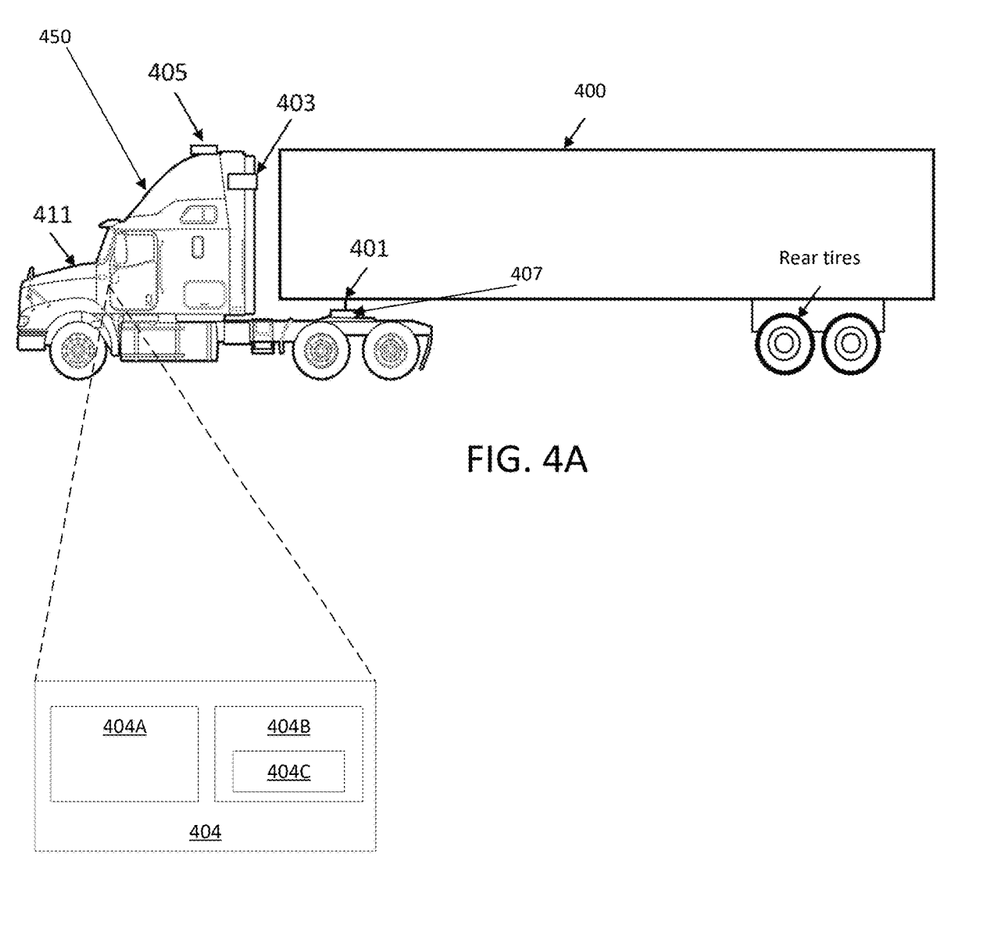
FIG. 4A illustrates an example tractor with an attached trailer that can be monitored according to an embodiment of the present disclosure.

FIG. 2 illustrates a system 600, which may be implemented on-board a tractor (e.g., tractor 450 illustrated in FIG. 4A). The tractor may tow a trailer (e.g., trailer 400 illustrated in FIG. 4A) and the system 600 may interact with a LIDAR system (e.g., LIDAR system 100 discussed above with respect to FIG. 1) implemented on-board the tractor in order to detect and monitor the motion of the trailer and perform corrective actions upon determining that the motion of the trailer is dangerous.

The system 600 may include, but is not limited to, a processor 602, memory 604, network interface 606, and one or more other hardware devices (not shown) such as e.g., a video display unit (e.g., a liquid crystal display (LCD) or a cathode ray tube (CRT)), an alphanumeric input device (e.g., a keyboard), a cursor control device (e.g., a mouse) and an acoustic signal generation device (e.g., a speaker). In one embodiment, the video display unit, alphanumeric input device, and cursor control device may be combined into a single component or device (e.g., an LCD touch screen).

The memory 604 may include a motion data unit 640 which may be executed by the processor 602 to receive point cloud data indicative of motion of the trailer provided by the LIDAR system 100 and apply the point cloud data as inputs to a matching algorithm, and/or a tracking algorithm in order to accurately determine motion data of the trailer. The memory 604 may also include a motion data analysis unit 650 which may be executed by the processor 602 in order to, among other things, receive, from the motion data unit 640, all or at least a portion of point cloud data to compare sets of motion data related to a trailer coupled to the tractor to a set of safe operating parameters (not shown in the FIGS.) stored in the memory 604. In this fashion, the motion data analysis unit 650 can be configured to determine whether the current motion of the trailer (indicated by the motion data) corresponds to positions of the trailer and/or tractor that can typically place the trailer and/or tractor in a dangerous position that can cause harm to a tractor occupant or items stored within the trailer.

The memory 604 also includes a trailer control unit 660, which may be executed by the processor 602 in order to instruct one or more components resident on the tractor to perform one or more "corrective" actions, either independent of one another or in concert, which in turn causes subsequently obtained motion data analyzed by the motion data analysis unit 650 to be within the set of safe operating parameters. In some embodiments, the corrective actions can include, but are not limited to, an alert to a human driver (e.g., by triggering vibration of the steering wheel, outputting sound effects/audio alerts via speakers, illuminating an indicator on a dashboard, or any other appropriate type of alert), active braking, or active steering. Although discussed as instructions which may be executed by the processor 602, in some embodiments the instructions 622 may be implemented as processing logic (e.g., firmware) 626 within processor 602. The instructions 622 may also be stored on a machine-readable storage medium (not shown in the FIGS.) which may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

System 600 may further include a network interface device 606 which may enable the system 600 to communicate with e.g., the LIDAR system 100 via a network 620. The network 620 may be a Wifi™, Bluetooth, local area network (LAN), an intranet, an extranet, the Internet, or any other appropriate wired or wireless network. The components of system 600 may communicate via bus 630.

Figure 3:
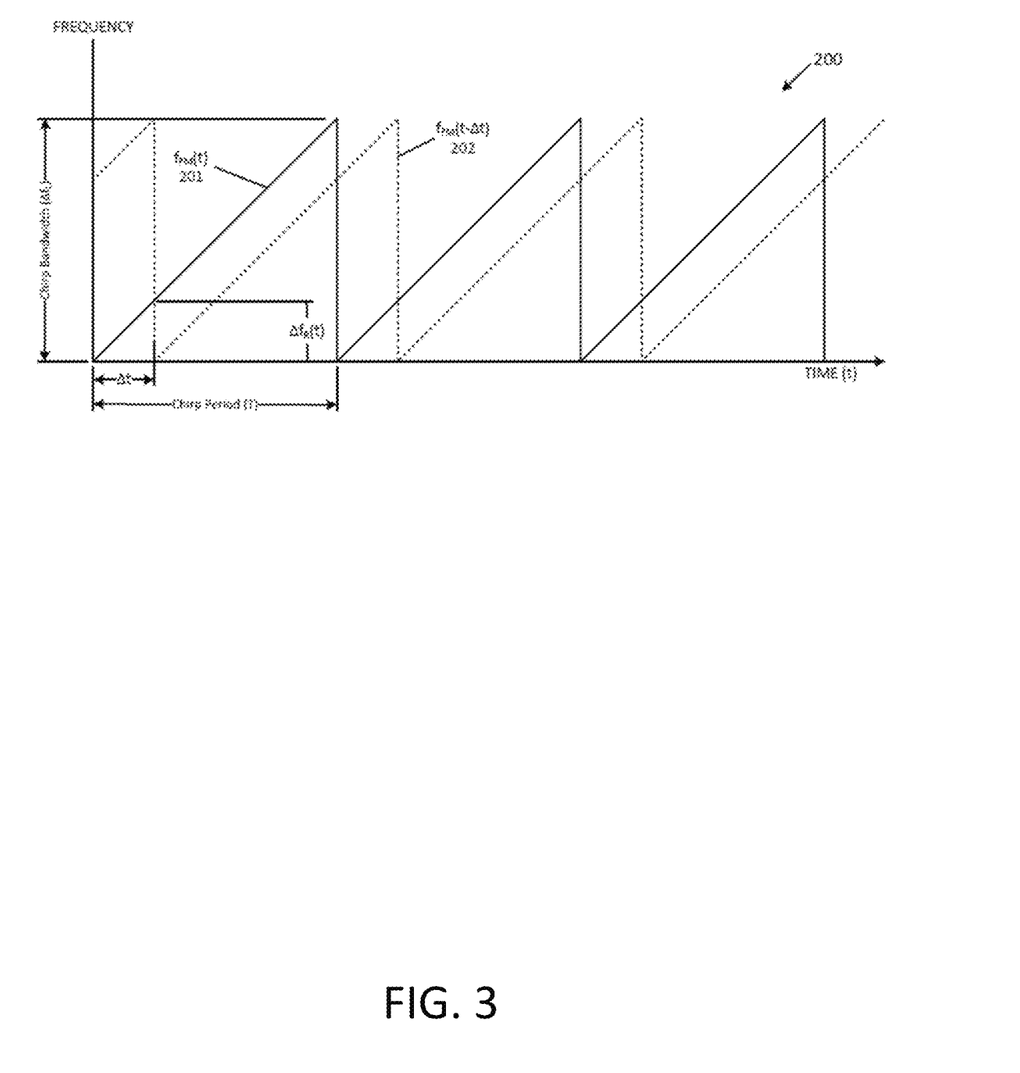
FIG. 3 is a time-frequency diagram illustrating how LIDAR waveforms are detected and processed according to embodiments of the present disclosure.

FIG. 3 is a time-frequency diagram 200 of an FMCW scanning signal 201 that can be used by a LIDAR system, such as system 100, to scan one or more trailers and/or attachments coupled to a tractor cab according to some embodiments. In one example, the scanning waveform 201, labeled as fFM (t), is a sawtooth waveform (sawtooth "chirp") with a chirp bandwidth $\Delta fC$ and a chirp period TC. The slope of the sawtooth is given as $k=(\Delta fC/TC)$. FIG. 3 also depicts target return signal 202 according to some embodiments. Target return signal 202, labeled as fFM (t-$\Delta t$), is a time-delayed version of the scanning signal 201, where $\Delta t$ is the round trip time to and from a target illuminated by scanning signal 201. The round trip time is given as $\Delta t=2R/v$, where R is the target range and v is the velocity of the optical beam, which is the speed of light c. The target range, R, can therefore be calculated as $R=c(\Delta t/2)$. When the return signal 202 is optically mixed with the scanning signal, a range dependent difference frequency ("beat frequency") $\Delta fR(t)$ is generated. The beat frequency $\Delta fR(t)$ is linearly related to the time delay $\Delta t$ by the slope of the sawtooth k. That is, $\Delta fR(t)=k\Delta t$. Since the target range R is proportional to $\Delta t$, the target range R can be calculated as $R=(c/2)(\Delta fR(t)/k)$. That is, the range R is linearly related to the beat frequency $\Delta fR(t)$. The beat frequency $\Delta fR(t)$ can be generated, for example, as an analog signal in optical receivers 104 of system 100. The beat frequency can then be digitized by an analog-to-digital converter (ADC), for example, in a signal conditioning unit such as signal conditioning unit 107 in LIDAR system 100. The digitized beat frequency signal can then be digitally processed, for example, in a signal processing unit, such as signal processing unit 112 in system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing ($\Delta fRmax$) is 500 megahertz. This limit in turn determines the maximum range of the system as $Rmax=(c/2)(\Delta fRmax/k)$ which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

FIG. 4A illustrates a trailer 400 that can be monitored by a tractor 450 that is towing it, in accordance with some embodiments of the present disclosure. The trailer 400 may include a kingpin 401 which may mate with the coupling 407 (also commonly referred to as a "fifth wheel") mounted on the rear of the tractor 450 to attach the trailer 400 to the tractor 450. As shown in FIG. 4A, a set of rear-facing LIDAR sensors 403 can be positioned high on the cabin of tractor 350, and can be supported by extended or extendable arms (not shown in the FIGS.) in order to better view the trailer 300. In this way, the position, velocity, and acceleration (lateral, longitudinal, and vertical) of the trailer 400 relative to both the tractor and the ground (or any appropriate surface) as well as the angular position, velocity, and acceleration (yaw, pitch, and roll) of the trailer 400 relative to both the tractor and the ground can be detected by the set of rear-facing LIDAR sensors 403 as discussed in further detail herein. In other embodiments, the set of rear-facing LIDAR sensors 403 can be positioned lower on the cabin in order to provide an improved view of the rear tires of the trailer. Accurate viewing of the rear tires of the trailer 400 by the set of rear-facing LIDAR sensors 403 can detect the rotational speed of the trailer tires, wheel lockup, and brake failure, etc. In some embodiments, detecting the rotational speed or wheel lockup of the trailer tires can prevent fires or explosions caused by dragging tires on the road. Accurate viewing of the rear tires of the trailer 400 may also enable the set of rear-facing LIDAR sensors 403 to detect when the trailer tires are crossing lane lines or are close to crossing lane lines.

The LIDAR sensors described herein may provide e.g., up to 40G dynamic range, 1 Khz sampling, up to six degrees of freedom measurements, and may include the ability to withstand a thermal environment up to 120 degrees Celsius, etc. These specifications are examples only and may vary depending on a number of factors including the type of tractor or vehicle the sensors are being implemented on, or the positioning of the sensors on the tractor/vehicle. Although the examples discussed in the present disclosure relate to tractor trailers and FMCW LIDAR sensors, the present invention is not limited to these particular vehicles or sensors, and can cover embodiments using time-of-flight sensors or other types of sensors, and vehicle/container combinations other than tractors and trailers.

The set of rear-facing LIDAR sensors 403 can detect the angle of the trailer 400 with respect to the coupling 407 with an accuracy of less than one degree. This is important because even one degree of deviation in the trailer 400 at the coupling 407 can imply an impending jackknife. Sensing the angle of the trailer 400 with respect to the coupling 407 can also assist with seeing the rear axle of the trailer 400, or the rear tire crossing a lane marker. In some embodiments, the kingpin 401 of the trailer 400 as well as the coupling 407 may each include one or more sensors (e.g., angle sensors or accelerometers) to help monitor the motion of trailer 400 (not shown in the FIGS.).

In some embodiments, the set of rear-facing LIDAR sensors 403 can detect the yaw rate, pitch, and roll of the trailer 400 accurately to well under one degree. The tractor 450 may also include an optical source 405, which may be any appropriate optical source such as e.g., an optical scanner, that may function to transmit an optical signal towards the trailer 400. Objects in the target environment (in this case, the trailer 400) may scatter the incident light provided by the optical source 405 into a return optical beam or a target return signal. The optical source 405 may collect these return optical beams or target return signals, and utilize them to enable the set of rear-facing LIDAR sensors 403 to scan the trailer 400 as discussed in further detail herein. The set of rear-facing LIDAR sensors 403 and the optical source 405 may be components of a LIDAR system such as LIDAR system 100 as discussed in further detail hereinabove.

The set of rear-facing LIDAR sensors 403 may continuously scan the trailer 400 to detect an end outline of the trailer 400, the top and bottom edges of the trailer 400, flat side panels of the trailer 400, and the front and sides of the rear outside tires of the trailer 400. Based on the scans of the trailer 400, the set of rear-facing LIDAR sensors 403 may generate point clouds representing motion data of the trailer 400. A point cloud is a set of data points in space that may represent a 3-dimensional (3D) shape or object. Each point position in the point cloud may have a respective set of Cartesian coordinates (X, Y, Z). As the set of rear-facing LIDAR sensors 403 continuously scan the trailer 400, they may generate point clouds at regular intervals. Any appropriate interval (e.g., 1 point cloud per second) may be used. The set of rear-facing LIDAR sensors 403 may (via the larger LIDAR control system they are a part of) provide the generated point clouds to computing device 404 (shown inset in FIG. 4A), which may be on board the tractor 450. For example, set of rear-facing LIDAR sensors 403 may be part of a LIDAR system having a signal processing unit such as signal processing unit 112 of the LIDAR control system 100 shown in FIG. 1. The signal processing unit may perform signal cleaning/conditioning and other signal processing of the point cloud data and transfer the point cloud to the computing device 404 (e.g., via a network interface (not shown) of the LIDAR control system 110).

In some embodiments, the computing device 404 may correspond to the on-board electronic control unit (ECU) of the tractor which controls the standard functionality of the tractor. In other embodiments, the computing device 404 may be any appropriate computing device (e.g., a microcontroller) dedicated to performing analysis of the point clouds to generate motion data of the trailer 400, analysis of the motion data, and instructing the tractor 450 or a driver thereof to perform corrective actions as described in further detail herein. The computing device 404 may include a processor 404A and a memory 404B (which may be similar to processor 602 and memory 604 of FIG. 2 respectively). The memory 404B may include a software module 404C (similar to instructions 622 of FIG. 2) which may be executed by the processor 404A in order to perform some of the functions described herein. For example, the software module 404C may include one or more matching algorithms and one or more tracking algorithms which the processor 404A may utilize when analyzing the point clouds generated by the set of rear-facing LIDAR sensors 403.

The point clouds provided by the set of rear-facing LIDAR sensors 403 may be used by the processor 404A (executing instructions of the module 404C corresponding to e.g., the motion data unit 640 shown in FIG. 2) as inputs to a matching algorithm, such as an iterative closest point (ICP) algorithm, followed by a tracking algorithm, such as an extended Kalman Filter (EKF), in order to accurately determine motion data of the trailer 400 (including absolute and relative trailer dynamics). The motion data may include, for example, the position, velocity, and acceleration (lateral, longitudinal, and vertical) of the trailer 400 relative to both the tractor and the ground (or any appropriate surface). In some embodiments, the motion data of the trailer 400 can include the angular position, velocity, and acceleration (yaw, pitch, and roll) of the trailer 400 relative to both the tractor and the ground. In still other embodiments, the motion data of the trailer 400 can include the bending and torsion of the trailer 400. The motion data of the trailer 400 may also include a rotational speed of a first tire of the trailer 400 relative to a second tire of the trailer 400.

The memory 404B may also include a set of safe operating parameters (not shown in the FIGS.), which define appropriate ranges that each aspect of motion data of the trailer 400 discussed above should be within. The processor 404A Upon determining an initial set of motion data from initial point clouds generated by the set of rear-facing LIDAR sensors 403, the processor 404A (executing instructions of the module 404C corresponding to e.g., the motion data analysis unit 650 shown in FIG. 2) and compare the determined initial set of motion data with the safe operating parameters (also referred to herein as safe operating thresholds). If one or more aspects of the initial set of motion data (e.g., angular velocity, yaw rate, pitch) are outside of their corresponding ranges prescribed by the safe operating parameters, the processor 404A may determine that the current motion of the trailer 400 (indicated by the initial set of motion data) corresponds to dangerous motion of some kind or a level of motion that is dangerous. The processor 404A may determine a particular type/kind of dangerous motion based on which aspects of the initial set of motion data are outside of their prescribed ranges, and how far outside of their prescribed ranges they are. For example, in response to determining that the rotational speed of a first tire of the trailer 400 relative to a second tire of the trailer 400 is outside of the prescribed range, the processor 404A may determine that the trailer 400 is losing traction and is in danger of skidding.

Upon determining that the observed motion of the trailer 400 corresponds to dangerous motion, the processor 404A (executing instructions of the module 404C corresponding to e.g., the trailer control unit 660 shown in FIG. 2) may instruct the tractor 450 to perform a corrective action such that a subsequent set of motion data of the trailer 400 is within the safe operating parameters. In some embodiments, the corrective action can include an alert to a human driver (e.g., by triggering vibration of the steering wheel, outputting sound effects/audio alerts via speakers, illuminating an indicator on a dashboard, or any other appropriate type of alert), active braking, or active steering. For example, the processor 404A may provide instructions to the tractor 450 to engage in active steering by reducing a turn angle, or by keeping the trailer 400 within lane lines, or by avoiding an obstacle. If the processor 404A determines that the initial set of motion data is within the safe operating parameters, then it may continue monitoring motion data generated based on point cloud data received from the set of rear-facing LIDAR sensors 403 until the motion data indicates that the motion of the trailer 400 corresponds to dangerous motion.

The location of the set of rear-facing LIDAR sensors 403 on the cabin can of the tractor 450 may be in motion with respect to the chassis of the tractor 450 or the location of the coupling 407, owing to natural bending and torsion of the trailer 400 during motion. Thus, in some embodiments, the processor 404A may generate self-corrected point cloud data by taking into consideration the displacement between the chassis of the tractor 450 and the cabin of the tractor 450. Indeed, because the set of rear-facing LIDAR sensors 403 can also detect the ground, as well as various points on the trailer 400, the LIDAR control system incorporating the set of rear-facing LIDAR sensors 403 can self-correct for any movements of the sensors with respect to the tractor chassis. The processor 404A may also account for vibration isolation (e.g., removing frequencies not associated with actual road surfaces). In some embodiments, the LIDAR control system incorporating the set of rear-facing LIDAR sensors 403 may perform this self-correction of the point cloud data itself and provide the self-corrected point cloud data directly to the computing device 404.

In some embodiments, the computing device 404 may take into account high resolution range information, and in particular Doppler information available on a per-point basis through an FMCW LIDAR to provide highly accurate, low latency information regarding the dynamics of the trailer 400 (also referred to herein as high fidelity motion data). The resulting high fidelity motion data can be used as a basis to provide instability alerts to a human driver through an advanced drive assistance system (ADAS), and/or active interventions such as braking and/or steering. The active intervention can be conducted in an autonomous driving system as commanded by adaptive cruise control (ADC).

Figure 4B:
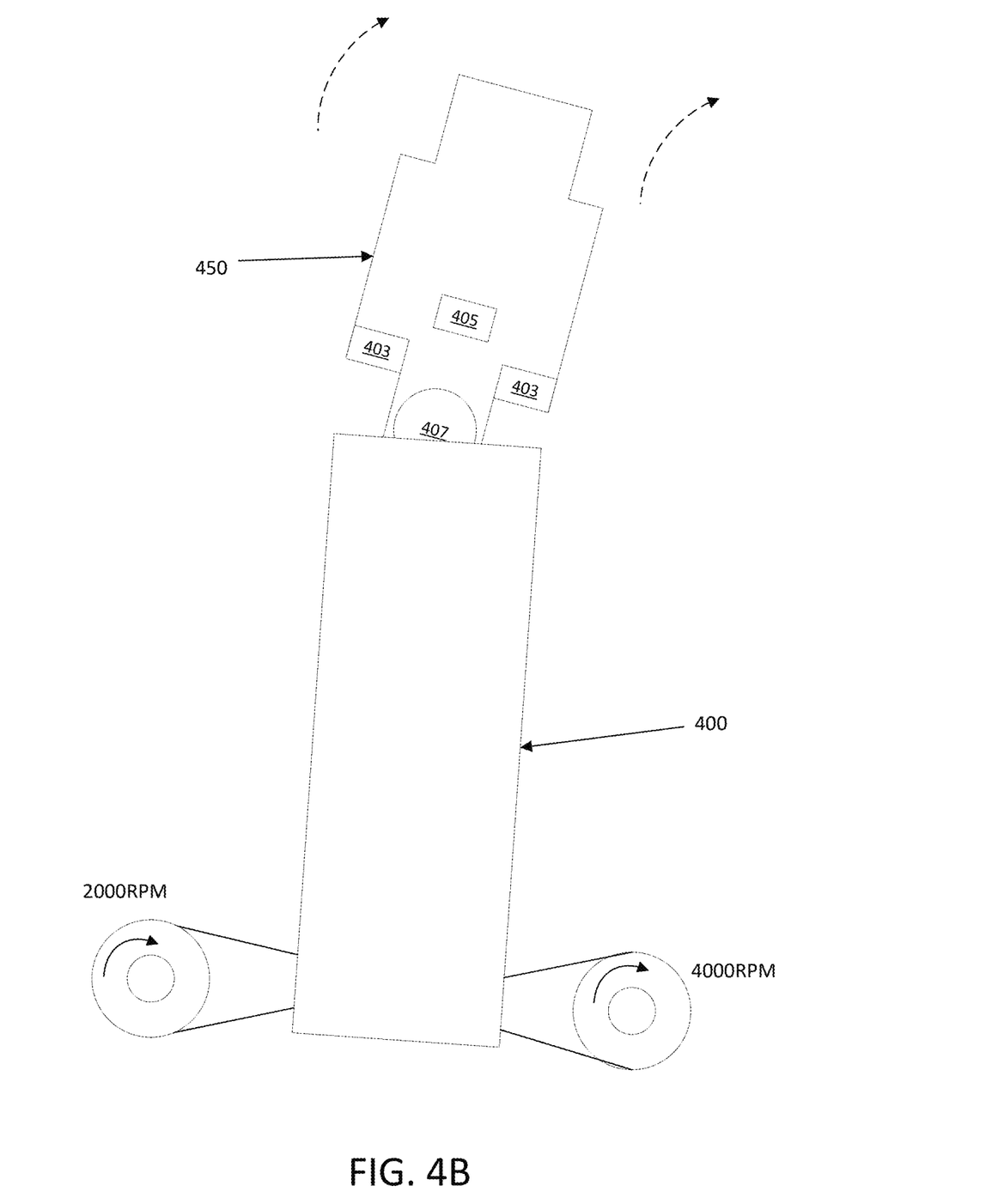
FIG. 4B illustrates an example tractor with an attached trailer in a scenario where the trailer is engaging in dangerous motion, according to an embodiment of the present disclosure.

FIG. 4B illustrates a scenario where the tractor 450 is turning to the right (e.g., around a bend or corner) as shown by the dashed arrows, and the initial set of motion data of the trailer 400 indicates that the left rear tires of the trailer 400 are rotating at 2000 revolutions per minute (RPM) while the right rear tires of the trailer 400 are rotating at 4000 RPM. The processor 404A may compare this initial set of motion data to the safe operating parameters stored in memory 404B and determine that the differential between right and left rear tire speed is beyond the threshold, and that this may be causing drag as the trailer 400 attempts to turn with the tractor 450. Thus, the processor 404A may instruct the tractor 450 to take any appropriate corrective action (e.g., reduce turn angle and/or speed of the tractor 450 through the turn).

Referring back to FIG. 4A, in some embodiments, the processor 404 may utilize input from front-facing LIDAR sensors 411 in combination with input from the set of rear-facing LIDAR sensors 403 to determine if the trailer 400 is experiencing a dangerous condition. The front-facing LIDAR sensors 411 may scan the environment in front of the tractor 450 (including the front of the tractor 450 that extends beyond the front-facing LIDAR sensors 411) to generate point cloud data corresponding to the motion of the tractor 450 (e.g., heading and ego-motion estimation of the tractor 450). The front-facing LIDAR sensors 411 may generate point cloud data corresponding to the motion of the tractor 450 in a manner similar to the way the set of rear-facing LIDAR sensors 403 generate point cloud data based on movement of the trailer 400. The processor 404A may determine tractor motion data based on input (e.g., point clouds) from the front-facing LIDAR sensors 411, which corresponds to the motion of the tractor 450. The processor 404A may determine tractor motion data in a manner similar to the manner in which it determines motion data of the trailer 400.

In embodiments where the processor 404A receives point cloud data from the set of rear-facing LIDAR sensors 403, as well as tractor motion data from the front-facing LIDAR sensors 411, the processor 404A may determine an initial set of motion data of the trailer 400, and compare the initial set of motion data to the tractor motion data to determine whether the observed motion of the trailer 400 (indicated by the initial set of motion data) corresponds to the motion of the tractor 450 or a pending instability event. More specifically, the processor 404A may determine whether the motion of the trailer 400 indicated by the initial set of motion data is beyond a threshold amount of motion that would normally correspond to the tractor motion indicated by the tractor motion data, and if not, determine that the motion of the trailer 400 corresponds to a pending instability event. For example, if the tractor motion data indicates that the tractor 450 is driving in a straight line, while the initial set of motion data indicates that the trailer 400 is swaying side to side, the processor 404A may determine that an instability event is occurring. The processor 404A may ensure that the level of side to side motion of the trailer 400 indicated by the initial set of motion data is beyond a threshold amount of side to side motion of the trailer 400 that would correspond to straight motion of the tractor 450 to account for natural motion of the trailer during driving and environmental factors such as e.g., wind.

Upon determining that the observed motion of the trailer 400 corresponds to a pending instability event, and not the motion of the tractor 450 (as indicated by the tractor motion data) the processor 404A may instruct the tractor 450 to perform a corrective action as discussed hereinabove.

Figure 4C:
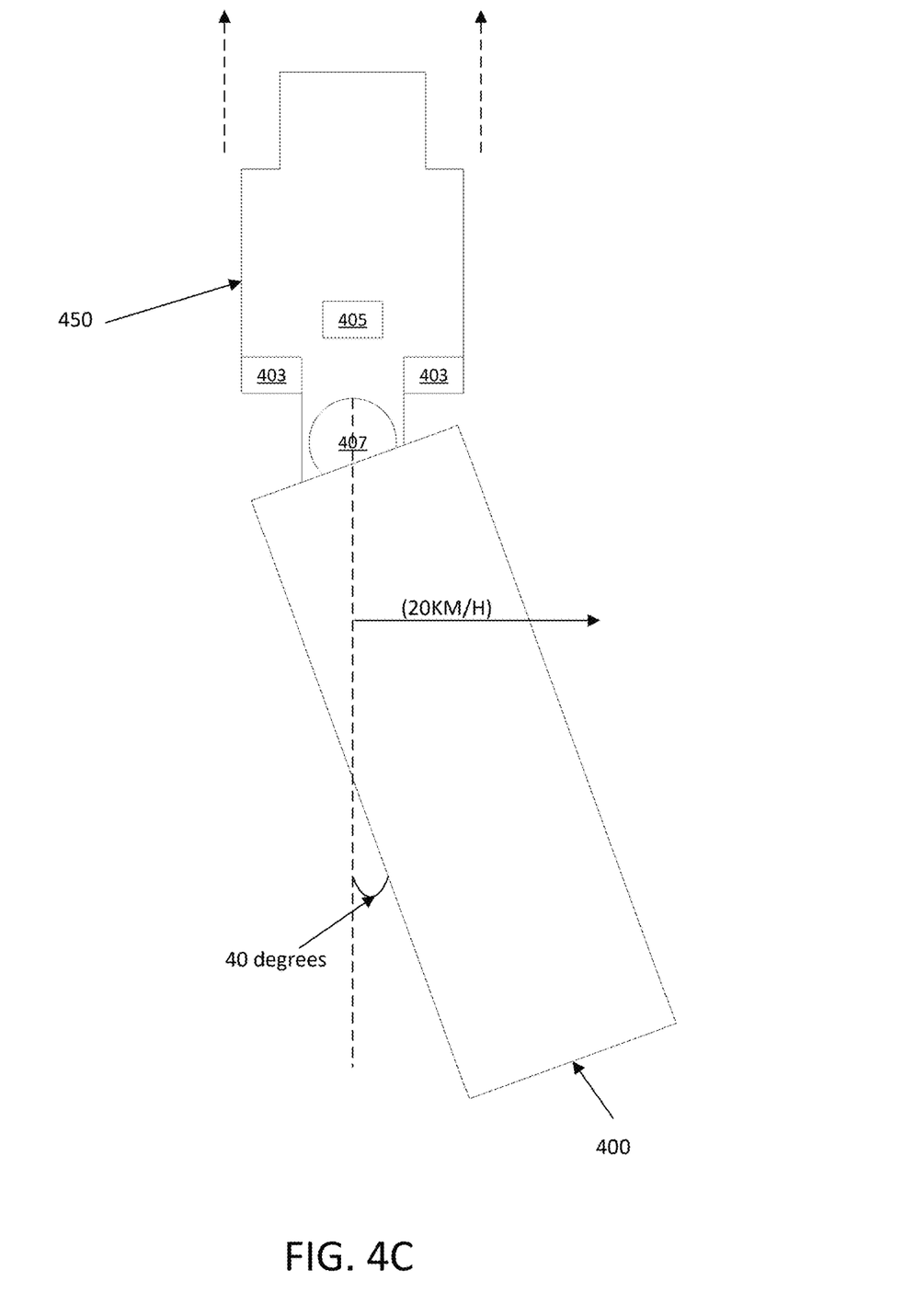
FIG. 4C illustrates an example tractor with an attached trailer in a scenario where the motion of the trailer does not correspond properly with the motion of the tractor, according to an embodiment of the present disclosure.

FIG. 4C illustrates a scenario where the initial set of motion data of the trailer 400 indicates that the trailer 400's lateral velocity is 20 kilometers per hour (KPH) and that the trailer 400 is swinging to the right of the central axis (shown with the dashed line in FIG. 4C) at an angle of 40 degrees. In the scenario of FIG. 4C, the processing device 404A may also receive point cloud data from the front-facing LIDAR sensors 411 and generate tractor motion data indicating that the tractor 450 is driving straight ahead (as indicated by the dashed arrows in the FIG.). Processor 404A may compare the initial set of motion data of the trailer 400 and the tractor motion data and determine that the motion of the trailer 400 corresponds to a pending instability event as a 40 degree swing off of the central axis and 20 KPH lateral velocity are too high to correlate properly to (i.e., are beyond the lateral velocity and "angle of the trailer 400 relative to the coupling 407" thresholds of) straight motion of the tractor 450. Thus, the processor 404A may instruct the tractor 450 to perform any appropriate corrective action as discussed in further detail herein.

Figure 5A:
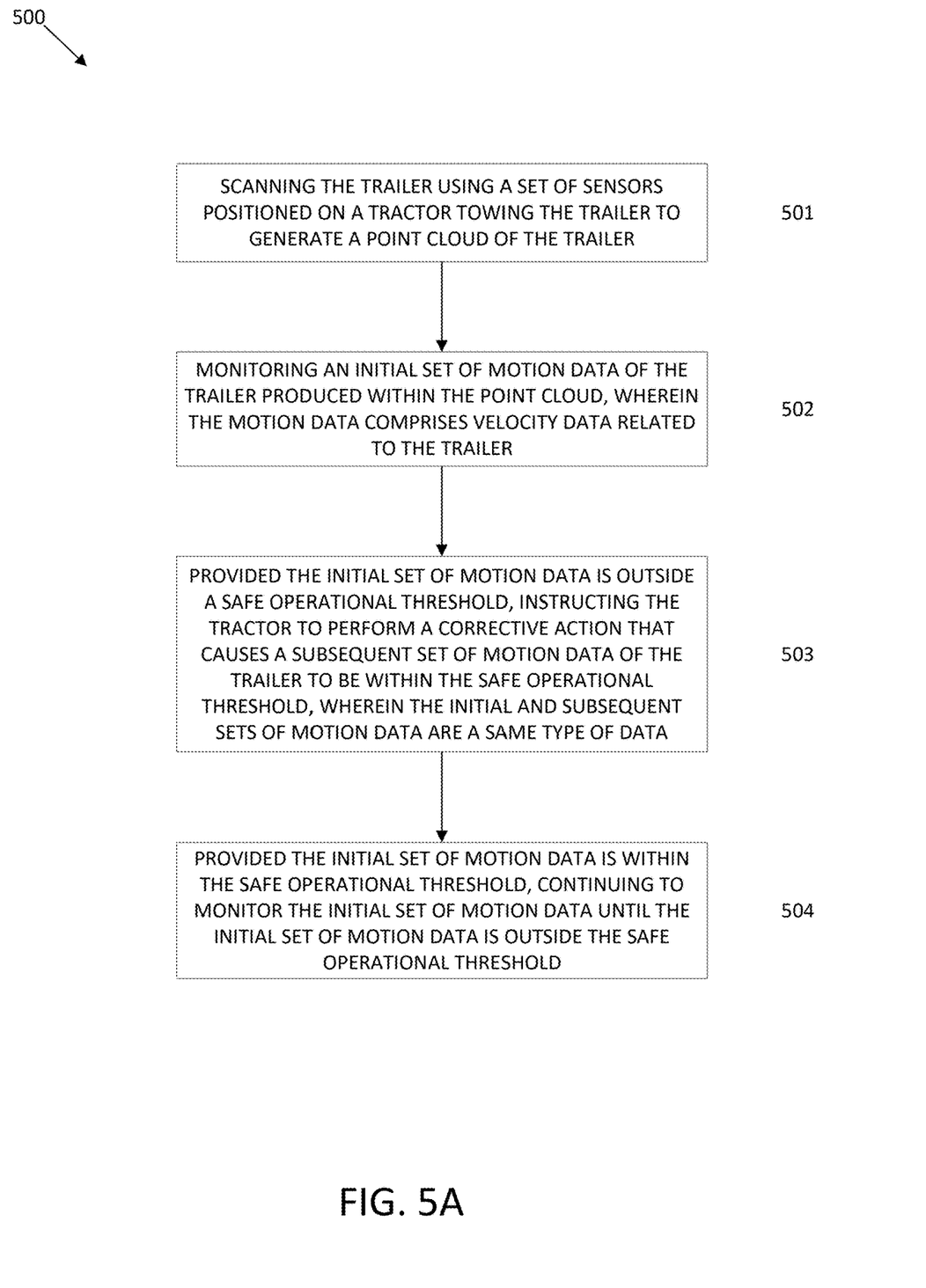
FIG. 5A is a flow diagram of an example method for monitoring trailer motion, according to an embodiment of the present disclosure.

FIG. 5A is a flow diagram of an example method 500 for monitoring a trailer dynamic, according to an embodiment of the present disclosure.

Referring also to FIG. 4A, the method 500 begins at operation 501 where the set of rear-facing LIDAR sensors 403 may scan the trailer 400 to detect an end outline of the trailer 400, the top and bottom edges of the trailer 400, flat side panels of the trailer 400, and the front and sides of the rear outside tires of the trailer 400. Based on the scans of the trailer 400, the set of rear-facing LIDAR sensors 403 may generate point clouds representing motion data of the trailer 400. As the set of rear-facing LIDAR sensors 403 continuously scan the trailer 400, they may generate point clouds at regular intervals. Any appropriate interval (e.g., 1 per second) may be used. The set of rear-facing LIDAR sensors 403 may (via the larger LIDAR control system they are a part of) provide the generated point clouds to computing device 404 (shown inset in FIG. 4A), which may be on board the tractor 450.

The processor 404A may determine an initial set of motion data from initial point clouds generated by the set of rear-facing LIDAR sensors 403, and at operation 502, may monitor the initial set of motion data. As part of this monitoring, the processor 404A may compare the determined initial set of motion data with the safe operating parameters (also referred to herein as safe operating thresholds). The motion data may include, for example, the position, velocity, and acceleration (lateral, longitudinal, and vertical) of the trailer 400 relative to both the tractor and the ground (or any appropriate surface). In some embodiments, the motion data of the trailer 400 can include the angular position, velocity, and acceleration (yaw, pitch, and roll) of the trailer 400 relative to both the tractor and the ground. In still other embodiments, the motion data of the trailer 400 can include the bending and torsion of the trailer 400. The motion data of the trailer 400 may also include a rotational speed of a first tire of the trailer 400 relative to a second tire of the trailer 400.

The method 500 continues at operation 503 where if one or more aspects of the initial set of motion data (e.g., angular velocity, yaw rate, pitch) are outside of their corresponding ranges prescribed by the safe operating parameters, the processor 404A may instruct the tractor 450 to perform a corrective action such that a subsequent set of motion data of the trailer 400 is within the safe operating parameters. In some embodiments, the corrective action can include an alert to a human driver (e.g., by triggering vibration of the steering wheel, outputting sound effects/audio alerts via speakers, illuminating an indicator on a dashboard, or any other appropriate type of alert), active braking, or active steering.

At operation 504, if the processor 404A determines that the initial set of motion data is within the safe operating parameters, then it may continue monitoring motion data generated based on point cloud data received from the set of rear-facing LIDAR sensors 403 until the motion data indicates that the motion of the trailer 400 corresponds to dangerous motion.

Figure 5B:
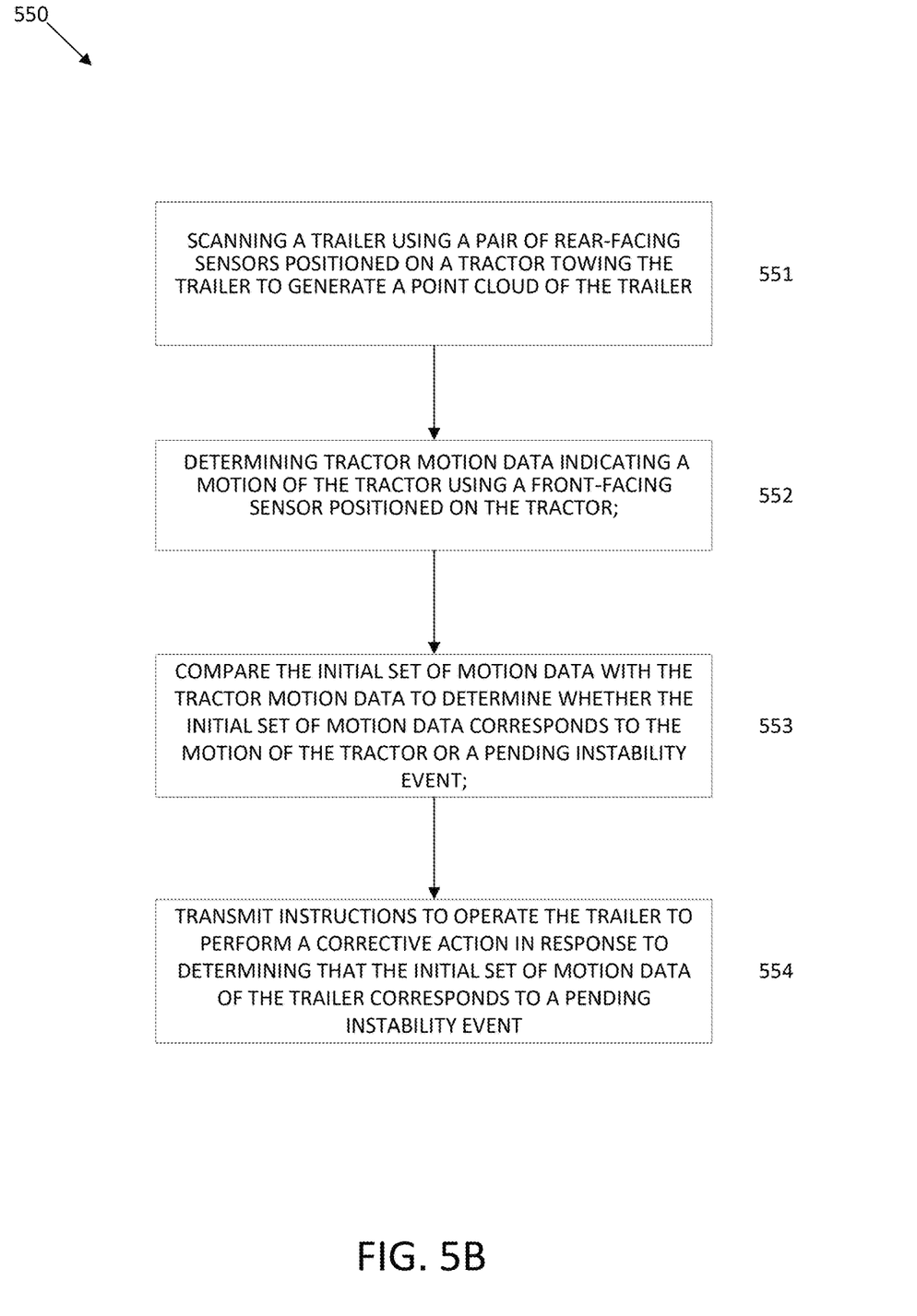
FIG. 5B is a flow diagram of an example method for monitoring trailer motion, according to an embodiment of the present disclosure.

FIG. 5B is a flow diagram of an example method 550 for monitoring a trailer dynamic, according to an embodiment of the present disclosure.

At operation 551, the set of rear-facing LIDAR sensors 403 may scan the trailer 400 to detect an end outline of the trailer 400, the top and bottom edges of the trailer 400, flat side panels of the trailer 400, and the front and sides of the rear outside tires of the trailer 400. Based on the scans of the trailer 400, the set of rear-facing LIDAR sensors 403 may generate point clouds representing motion data of the trailer 400.

At operation 552, the front-facing LIDAR sensors 411 may scan the environment in front of the tractor 450 (including the front of the tractor 450 that extends beyond the front-facing LIDAR sensors 411) to generate point cloud data corresponding to the motion of the tractor 450. The processor 404A may determine tractor motion data based on input (e.g., point clouds) from the front-facing LIDAR sensors 411, which corresponds to the motion of the tractor 450. The processor 404A may determine tractor motion data in a manner similar to the manner in which it determines motion data of the trailer 400.

The processor 404A may determine an initial set of motion data of the trailer 400, and at operation 553, may compare the initial set of motion data to the tractor motion data to determine whether the observed motion of the trailer 400 (indicated by the initial set of motion data) corresponds to the motion of the tractor 450 or a pending instability event. More specifically, the processor 404A may determine whether the motion of the trailer 400 indicated by the initial set of motion data is beyond a threshold amount of motion that would normally correspond to the tractor motion indicated by the tractor motion data, and if not, determine that the motion of the trailer 400 corresponds to a pending instability event. For example, if the front-facing LIDARS determine that the tractor is accelerating forward in a straight line at a particular rate, but the rear-facing LIDARS determine that the trailer is accelerating at a different rate or in a different direction, this may indicate a pending instability event.

At operation 554, upon determining that the observed motion of the trailer 400 corresponds to a pending instability event, and not the motion of the tractor 450 (as indicated by the tractor motion data) the processor 404A may instruct the tractor 450 to perform a corrective action as discussed hereinabove.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A method for dynamic monitoring of a trailer using a light detection and ranging (LIDAR) system comprising:
    scanning the trailer using a set of sensors positioned on a tractor towing the trailer to generate a point cloud of the trailer;
    monitoring an initial set of motion data of the trailer produced within the point cloud, wherein the motion data comprises velocity data related to the trailer;
    provided the initial set of motion data is outside a safe operational threshold, instructing the tractor to perform a corrective action that causes a subsequent set of motion data of the trailer to be within the safe operational threshold, wherein the initial and subsequent sets of motion data are a same type of data;
    provided the initial set of motion data is within the safe operational threshold, continuing to monitor the initial set of motion data until the initial set of motion data is outside the safe operational threshold.

2. The method of claim 1, wherein scanning the trailer further comprises:
    detecting a position of the trailer based on one or more of: an end outline of the trailer, top and bottom side edges of the trailer, flat side panels of the trailer, and front and side areas of rear outside tires of the trailer.

3. The method of claim 1, wherein the motion data further comprises: a position, velocity, and acceleration of the trailer in lateral, longitudinal, and vertical directions relative to both the tractor and a surface.

4. The method of claim 1, wherein the motion data further comprises: yaw, pitch, and roll of the trailer relative to both the tractor and a surface.

5. The method of claim 1, wherein the motion data further comprises bending and torsion of the trailer, a rotational speed of a first tire of the trailer relative to a second tire of the trailer.

6. The method of claim 1, wherein the corrective action further comprises at least one of: providing an instability alert to a driver of the tractor, active braking of the tractor, and active steering of the tractor.

7. The method of claim 1, wherein monitoring the initial set of motion data further comprises:
monitoring a first portion of the initial set of motion data using one or more front-facing sensors; and
monitoring a second portion of the initial set of motion data using one or more trailer-facing sensors.

8. The method of claim 7, wherein instructing further comprises: provided the first and second portions are outside the safe operational threshold, instructing the tractor to perform the corrective action.

9. The method of claim 8, wherein the safe operation threshold represents a degree of expected motion between the first and second portions.

10. The method of claim 1, wherein the LIDAR system is a frequency modulated continuous wave (FMCW) LIDAR system.

11. A system for dynamic monitoring of a trailer using a light detection and ranging (LIDAR) system comprising:
an optical source to transmit a light signal towards the trailer;
a set of scanners, positioned on a tractor towing the trailer, to scan the trailer to generate a point cloud of the trailer based on the light signal;
a processor coupled to the set of scanners, configured to:
monitor an initial set of motion data of the trailer produced within the point cloud, wherein the motion data comprises velocity data related to the trailer;
provided the initial set of motion data is outside a safe operational threshold, instruct one or more components resident on the tractor to cause the tractor to perform a corrective action that causes a subsequent set of motion data of the trailer to be within the safe operational threshold, wherein the initial and subsequent sets of motion data are a same type of data; and
provided the initial set of motion data is within the safe operational threshold, continue to monitor the initial set of motion data until the initial set of motion data is outside the safe operational threshold.

12. The system of claim 11, wherein the processor is further configured to:
detect a position of the trailer based on one or more of: an end outline of the trailer, top and bottom side edges of the trailer, flat side panels of the trailer, and front and side areas of rear outside tires of the trailer.

13. The system of claim 11, wherein the motion data further comprises: a position, velocity, and acceleration of the trailer in lateral, longitudinal, and vertical directions relative to both the tractor and a surface.

14. The system of claim 11, wherein the motion data further comprises: yaw, pitch, and roll of the trailer relative to both the tractor and a surface.

15. The system of claim 11, wherein the motion data further comprises: bending and torsion of the trailer, a rotational speed of a first tire of the trailer relative to a second tire of the trailer.

16. The system of claim 11, wherein the corrective action further comprises at least one of: providing an instability alert to a driver of the tractor, active braking of the tractor, and active steering of the tractor.

17. The system of claim 11, wherein monitoring the initial set of motion data further comprises:
monitoring a first portion of the initial set of motion data using one or more of the set of scanners that are front-facing; and
monitoring a second portion of the initial set of motion data using one or more of the set of sensors that are trailer-facing.

18. The system of claim 17, wherein instructing the one or more components resident on the tractor further comprises:
provided the first and second portions are outside the safe operational threshold, instructing the one or more components resident on the tractor the tractor to perform the corrective action.

19. The system of claim 18, wherein the safe operation threshold represents a degree of expected motion between the first and second portions.

20. The system of claim 17, wherein the motion data of the trailer further comprises: a position, velocity, and acceleration of the trailer in lateral, longitudinal, and vertical directions relative to both the tractor and a surface.

21. The system of claim 17, wherein the motion data further comprises: bending and torsion of the trailer, as well as yaw, pitch, and roll of the trailer relative to both the tractor and a surface.

22. The system of claim 11, wherein the LIDAR system is a frequency modulated continuous wave (FMCW) LIDAR system.

23. A system for dynamic monitoring of a trailer using a light detection and ranging (LIDAR) system, the system comprising:
an optical source to transmit a light signal towards the trailer;
a pair of rear-facing sensors positioned on a tractor towing the trailer to scan the trailer to generate a point cloud of the trailer based on the light signal;
a front-facing sensor to determine tractor motion data indicating a motion of the tractor;
a processor coupled to the pair of rear-facing sensors and the front-facing sensor, configured to:
monitor an initial set of motion data of the trailer produced within the point cloud, wherein the motion data comprises velocity data related to the trailer;
compare the initial set of motion data with the tractor motion data to determine whether the initial set of motion data corresponds to the motion of the tractor or a pending instability event; and
transmit instructions to operate the trailer to perform a corrective action in response to determining that the initial set of motion data of the trailer corresponds to a pending instability event; and
a trailer control device configured to receive from the processor, the instructions to operate the trailer to perform a corrective action.

24. The system of claim 23, wherein the processor is further configured to:
detect a positioning of the trailer based on one or more of: an end outline of the trailer, top and bottom side edges of the trailer, flat side panels of the trailer, and front and side areas of rear outside tires of the trailer.

* * * * *